(12) United States Patent
Vaidyanathan et al.

(10) Patent No.: US 6,502,233 B1
(45) Date of Patent: Dec. 31, 2002

(54) AUTOMATED HELP SYSTEM FOR REFERENCE INFORMATION

(75) Inventors: Shankar Vaidyanathan, Bellevue; Philip Lucido, Redmond; Sundeep Bhatia, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,757

(22) Filed: Nov. 13, 1998

(51) Int. Cl.$^7$ ................................................ G06F 9/44
(52) U.S. Cl. ........................ 717/101; 717/106; 717/163
(58) Field of Search .......................... 717/1, 2, 11, 106, 717/163, 164, 100, 101, 110; 345/326, 327; 709/300, 303, 305; 707/500, 513, 516, 526, 530

(56) References Cited

U.S. PATENT DOCUMENTS

| | | | | |
|---|---|---|---|---|
| 4,809,170 A | * | 2/1989 | Leblang et al. ............. | 717/122 |
| 5,430,836 A | * | 7/1995 | Wolf et al. .................. | 345/335 |
| 5,627,958 A | * | 5/1997 | Potts et al. .................. | 345/336 |
| 5,644,737 A | * | 7/1997 | Tuniman et al. ............. | 345/352 |
| 5,694,559 A | * | 12/1997 | Hobson et al. .............. | 411/120 |
| 5,781,720 A | * | 7/1998 | Parker et al. ................. | 714/38 |
| 5,825,355 A | * | 10/1998 | Palmer et al. ............... | 345/336 |
| 5,859,638 A | * | 1/1999 | Coleman et al. ............. | 345/341 |
| 5,872,974 A | * | 2/1999 | Mezick ........................ | 717/109 |
| 5,911,059 A | * | 6/1999 | Profit, Jr. ..................... | 703/23 |
| 6,053,951 A | * | 4/2000 | McDonald et al. ............ | 717/1 |
| 6,071,317 A | * | 6/2000 | Nagel ............................. | 717/4 |
| 6,205,579 B1 | * | 3/2001 | Southgate .................... | 717/173 |
| 6,275,976 B1 | * | 8/2001 | Scandura ..................... | 717/120 |

OTHER PUBLICATIONS

Franke et al, "Authoring a hypertext help manual", ACM pp 238–245, 1995.*
Paterno, "Automatic genertaion of task oriented help", UIST ACM pp 181–187, Nov. 1995.*
Sukaviriya et al, "Automatic generation of textual, audio and animated help in UIDE: the user interface design environment", AVI ACM pp 44–52, Feb. 1994.*
Szekely et al. "Automatic generation of help from interface design module", ACM CHI, pp 225–231, Jun. 1994.*
Olsson, "Population management for automatic design of algorithms through evolution", IEEE, pp 592–597, Sep. 1998.*
Franke et al, "Authoring a hypertext unix help manual", ACM pp 238–245, 1995.*
Comeau et al, A window based help, tutorial and documentation system, ACM, pp 71–81, Jan. 1993.*

* cited by examiner

Primary Examiner—Anil Khatri

(57) ABSTRACT

Automatic parameter help is disclosed. In one embodiment, the system comprises an editor to provide for developing source code for a computer program, where the source code includes an identifier; and an automatic help module invoked upon a predetermined event by the editor. The automatic help module is operative to display reference information associated with the identifier.

39 Claims, 9 Drawing Sheets

```
class Foo {
public:
        int x;          // X coordinate of object
        int y;          // Y coordinate of object         355
        int z;          // Z coordinate of object         360
                                                          365
        // getVolume calculates a volume for the object
        double getVolume(double length, double width, float height) const;
}
                                                                370
```

AUTOMATED HELP SYSTEM FOR REFERENCE INFORMATION

RELATED APPLICATIONS

This application is related to the following commonly assigned co-pending applications, all filed on Nov. 13, 1998:

"Dynamic Parsing"—U.S. patent application Ser. No. 09/191,499,

"Automatic Statement Completion"—U.S. patent application Ser. No. 09/191,781, and "Indexing and Searching Across Multiple Sorted Arrays"—U.S. patent application Ser. No. 09/192,057.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

FIELD

This invention relates generally to software development environments, and more particularly to automatically providing help information.

BACKGROUND

Over time computer programs and the software programming languages used to develop them have become more complex. Computer programs are typically composed of many different source code files and programming libraries. These libraries include system libraries, networking libraries and utility libraries comprising many different functions or methods. In addition, object oriented languages have implemented a concept referred to as function overloading. Function overloading occurs when multiple functions (or methods) within a class hierarchy share the same name (or identifier), but have differing numbers of parameters or differing parameter types. Because of the proliferation of libraries and classes, the number of functions available to a software developer has steadily risen. This makes it very difficult if not impossible for a software developer to remember the calling sequence for a particular function.

In addition to function definitions, classes in object oriented languages typically have member attributes such as functions and properties. These attributes are used to define varying aspects of the class. Often the source code defining these attributes has comments associated with the attributes indicating how they are used. The number of these attributes in any single class can grow quite large, and combined with the fact that attributes can be inherited from parent classes can make it difficult for a software developer to remember the purpose and use for a particular attribute.

A further factor complicating the software development effort is the fact that it is often the case that a software module will define a large number of identifiers. These identifiers comprise typedefs, variables, macros, parameters, namespaces, templates, attributes, etc. and must each have a type, declaration and/or definition specified. It is often difficult for a developer to remember the type and identifier for these entities. In addition this information is context dependent.

One manner by which compilers and interpreters have become somewhat easier to use is through the use of the Integrated Development Environment (IDE). These environments typically support some kind of on-line help mechanism allowing a developer to refer to on-line documentation describing varying function definitions, thereby providing an improvement over printed manuals and text searching across multiple source files. Also, these environments typically have browsers capable of opening multiple source files, allowing a developer to refer to the source file defining a particular function or class attribute while editing another source file. In addition, for object oriented languages, the IDE may also provide a browser allowing the developer access to the class hierarchy enabling a developer to browse a class definition.

While on-line help and browsers are an improvement to printed manuals and text searching, several problems remain. First, in order to look up the definition of a function or member attribute, the developer must locate the source file containing the function or attribute definition, consult the on-line help file, or locate the class name in the class hierarchy browser.

Second, the user must locate the function or attribute definition in the file, which typically involves either scrolling through the file, using a text search capability to search through the file, or using the browser to locate the function or attribute definition in the file.

Finally, once the function or attribute definition has been located, the user must typically alternate back and forth between the window containing the definition of the function or attribute (either in a file window or a class hierarchy window) and the window containing the source code currently being edited.

SUMMARY

The above-identified problems, shortcomings and disadvantages with the prior art, as well as other problems, shortcoming and disadvantages, are solved by the present invention, which will be understood by reading and studying the specification and the drawings. In one embodiment, the system includes an editor to provide for developing source code for a computer program. The source code includes statements containing identifiers. In addition, the editor, upon detecting an event from a pre-determined set of events, invokes an automatic help module. The automatic help module displays reference information associated with the identifier.

Thus one aspect of the invention is that while a programmer is developing or writing source code for a program, the automatic help module is invoked upon the occurrence of a predetermined event. The event can be the positioning of a cursor over an identifier followed by a clicking a mouse button, hovering the mouse cursor over an identifier, selecting a menu or icon after highlighting the identifier, or the event can be the entry of an identifier into the source code. The automatic help module then displays reference information regarding the identifier. In one embodiment of the invention, the reference information is a list of parameters for the function with the associated data type for each parameter. The first required parameter in the displayed list is highlighted. As the developer enters further function parameters (if any) in the source code, the next required parameter is highlighted. In addition, in one embodiment of the invention, as the user provides more data, the list of overloaded functions and their associated parameter sets can be pruned to remove those items that are incompatible with what the user has already entered.

In an alternative embodiment of the invention, the reference information is the data type of the identifier.

In a further alternative embodiment, the source code is searched for comments associated with an identifier. If any comments are found, the comments are displayed, thereby providing potentially useful information to the developer.

Thus embodiments of the invention have advantages not found in prior systems. The developer is able to view relevant reference information regarding functions and attributes without having to consult on-line help directories, source code files containing identifier definitions, paper documentation, or other potential sources of identifier information. This saves the developer time and does not interrupt the developer's train of thought. In this manner, development of computer programs is made easier and more productive as compared to previous systems.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
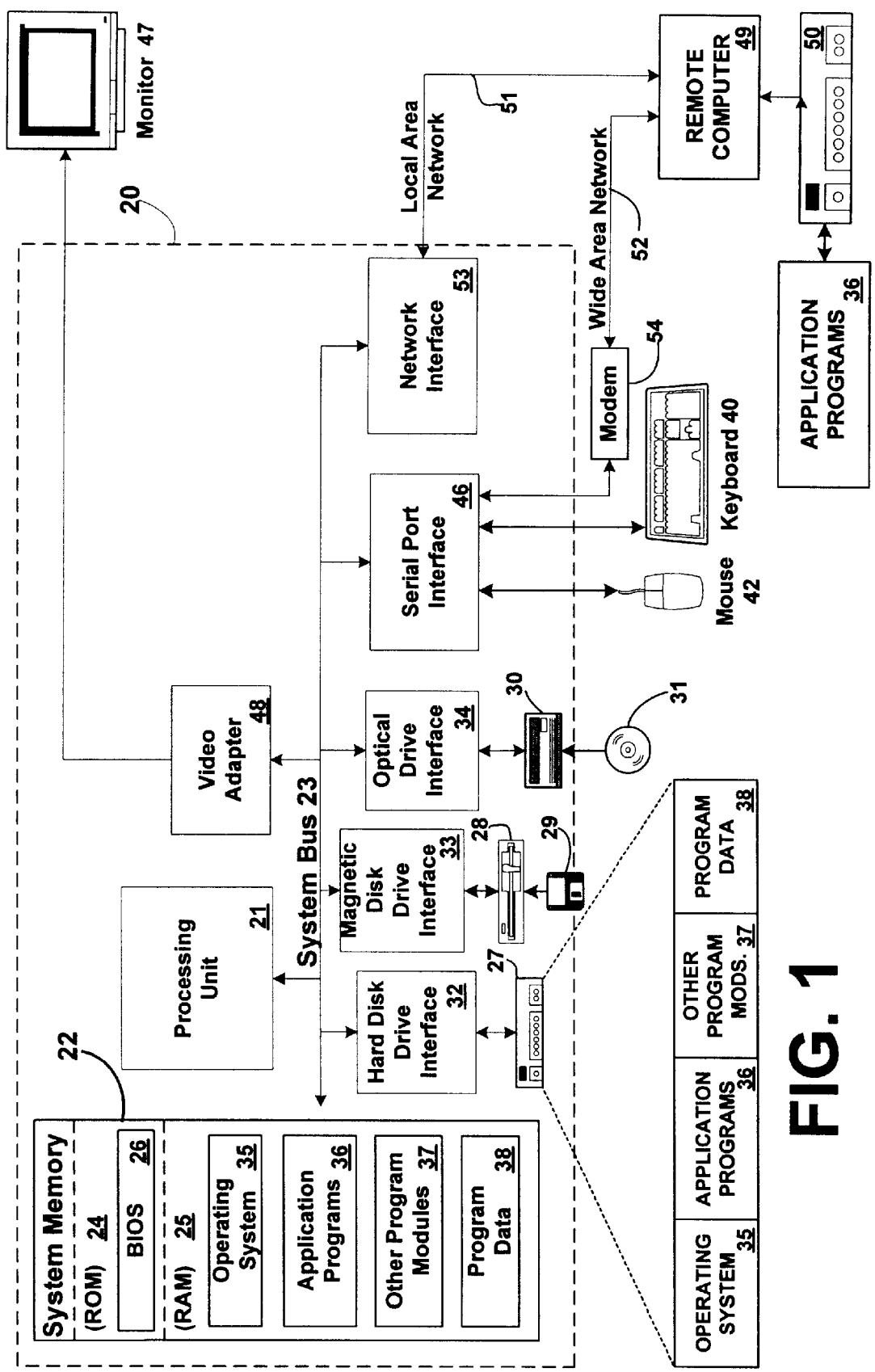
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
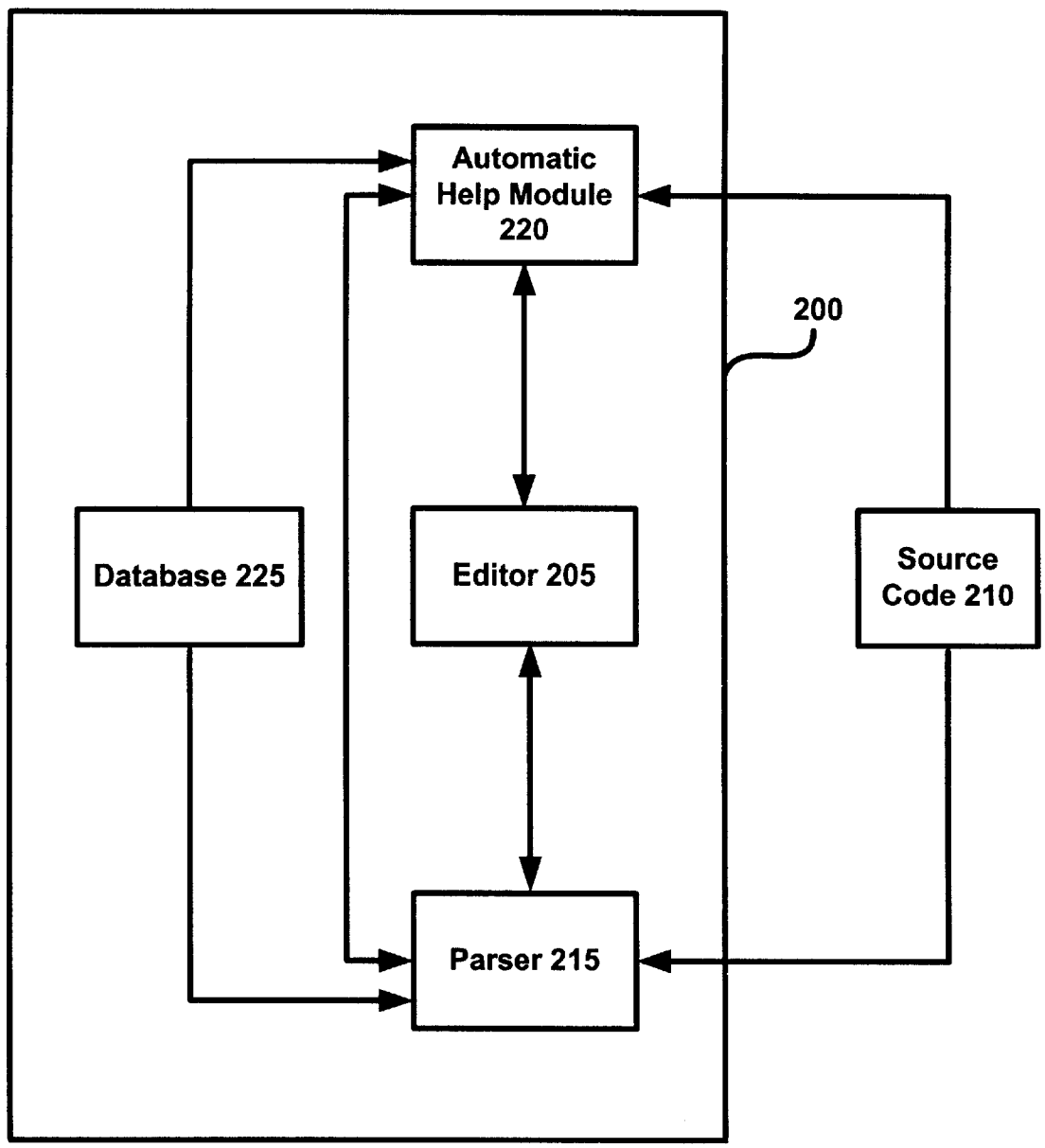
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention includes an Integrated Development Environment (IDE) 200. As shown, the IDE 200 includes an editor 205, parser 215, automatic help module 220 and database 225. Those of ordinary skill within the art will appreciate that the IDE 200 also may include other components, not shown in FIG. 2; only those parts necessary to describe the invention in an enabling manner are provided. The parser 215 may be a parser for any type of programming language; the invention is not so limited. For example, the parser 215 can in different embodiments parse the C, C++, Pascal, Visual BASIC, or Java programming languages etc., all of which are known in the art. In addition, IDE 200 may include what is known in the art as an interpreter.

The parser 215 converts source code 210 into executable code (not shown in FIG. 2). The source code 210 is a text description of a computer program, as written in a given programming language by or for one or more computer programmers. Typically and as is known in the art, the source code comprises a series of statements defining the data structures and the actions the computer is to perform using the data structures. These statements are composed of various programming language tokens, which are combined to form declarations and definitions that describe the entities that make up the computer program. Identifiers are used to identify particular entities in the program, such as function names, variable names, class names, macro names and template names. Those of ordinary skill in the art will recognize that various entities and identifier mechanisms are used in various programming languages.

The executable code is that which is produced by the IDE 200, so that the computer program can actually be run on a computer (for example, a computer as has been described in the preceding section of the detailed description). The parser 215 operates to parse the source code 210 according to the parsing rules applicable to a particular programming language. In one embodiment of the invention, the parser 215 stores and retrieves information to and from database 225.

The editor 205 of the IDE 200 provides for the developing (writing) of the source code 210 of a computer program.

Automatic help module 220 is invoked by editor 205 upon the occurrence of an event and employs the method described below with reference to FIG. 4 to automatically provide reference information on an identifier in the source code.

Database 225 is typically a file comprising a database that, in one embodiment of the invention, is used by the parser to store information including, but not limited to class definitions, member data types, member function names and their associated parameters. In addition, reference information such as source file names and line numbers where an entity is defined or referenced is stored in database 225. Database 225 typically includes information not only from source code 210, but also includes information from other sources including system header files and files from class libraries including Microsoft Foundation Class (MFC) header files and ActiveX Template Libraries (ATL), all of which are known in the art. The database 225 stores an indicator as to which of the above-mentioned sources was used to populate the particular database record.

In one embodiment of the invention, database 225 is referred to as an NCB (No Compile Browse) file, and is populated and maintained by the parser module 215. In this embodiment, the parser module 215 dynamically updates the database 225 as the source code is modified or added to by the user. The creation and maintenance of the database 225 by parser module 215 is more fully described in coassigned, cofiled and copending application entitled "Dynamic Parsing" which has been previously incorporated by reference.

In an alternative embodiment of the invention, database 225, while appearing as one database to the user, is actually comprised of multiple stores or databases. In this embodiment, a first database is dynamically updated by the parser, as described above. In addition to the first dynamically updated database, one or more pre-created databases exist. The pre-created databases contain information that seldom changes, such as operating system declarations and header files, Microsoft Foundation Class definitions and header files, and the ActiveX Template Library referred to above. Those of ordinary skill in the art will recognize that other class definitions and header files could be included in the pre-created database. It is desirable to provide such a pre-created database because of the large amount of information that is provided by the class definitions and header files. This information seldom changes, and therefore does not need to be re-parsed and stored in the dynamically updated database. This allows the parser to dynamically parse the user developed code, which does change frequently, in an acceptable amount of time.

Thus, in accordance with one embodiment of the invention, the system of FIG. 2 operates as follows. A developer drafts the source code 210 using the editor 205. As the developer is writing the source code 210, editor 205 detects a predetermined event and invokes automatic help module 220. Automatic help module 220 then queries database 225 and uses the information found therein to display a tooltip box providing reference information on an identifier in the source code. In one embodiment of the invention, the predetermined event occurs when a user enters a particular token or type of token. Examples of tokens include identifier names, function name, class names, macro names, global and local variable names, and operators.

In an alternative embodiment, the automatic help module 220 is invoked when the user positions a cursor over an identifier. The module can be invoked either by pressing a button, or by allowing the mouse cursor to "hover" over the token.

In a further alternative embodiment of the invention, automatic help module 220 is invoked when the user highlights a token and presses a mouse button or hot-key. A hot-key is known in the art, and typically comprises a function key or sequence of predefined keys that have special meaning to an application.

The invention is not limited to the mechanisms described above to invoke the automatic help module, and those of ordinary skill in the art will appreciate that other mechanisms can be utilized and are within the scope of the invention. Such mechanisms include menu selection and icon selection.

Figure 3A:
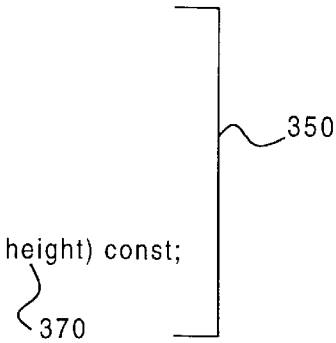
FIG. 3(a) shows a sample C++ class definition.

FIG. 3(a) presents a sample class definition and FIGS. 3(b)–3(f) illustrate representative screen shots of editing sessions using the class definition. FIGS. 3(a)–3(f) are discussed in the context of the C++ programming language, however the invention is not so limited. The invention is adaptable to any programming language. Referring now to FIG. 3(a), a C++ class definition 350 is presented for the class named "Foo". Sample class Foo has three member attributes, an x coordinate location attribute 355, a y coordinate location attribute 360, and a z coordinate location attribute 365. The three attributes have comments associated with them indicating their intended use. In addition, class Foo has a member function getVolume 370 which accepts three parameters. The declaration for getVolume is preceded by a code comment indicating the method's purpose. The class definition for class Foo may be contained in the source code 210 file currently being edited, or more commonly, it may be contained in any of a number of files comprising the source code for the application.

Figure 3B:
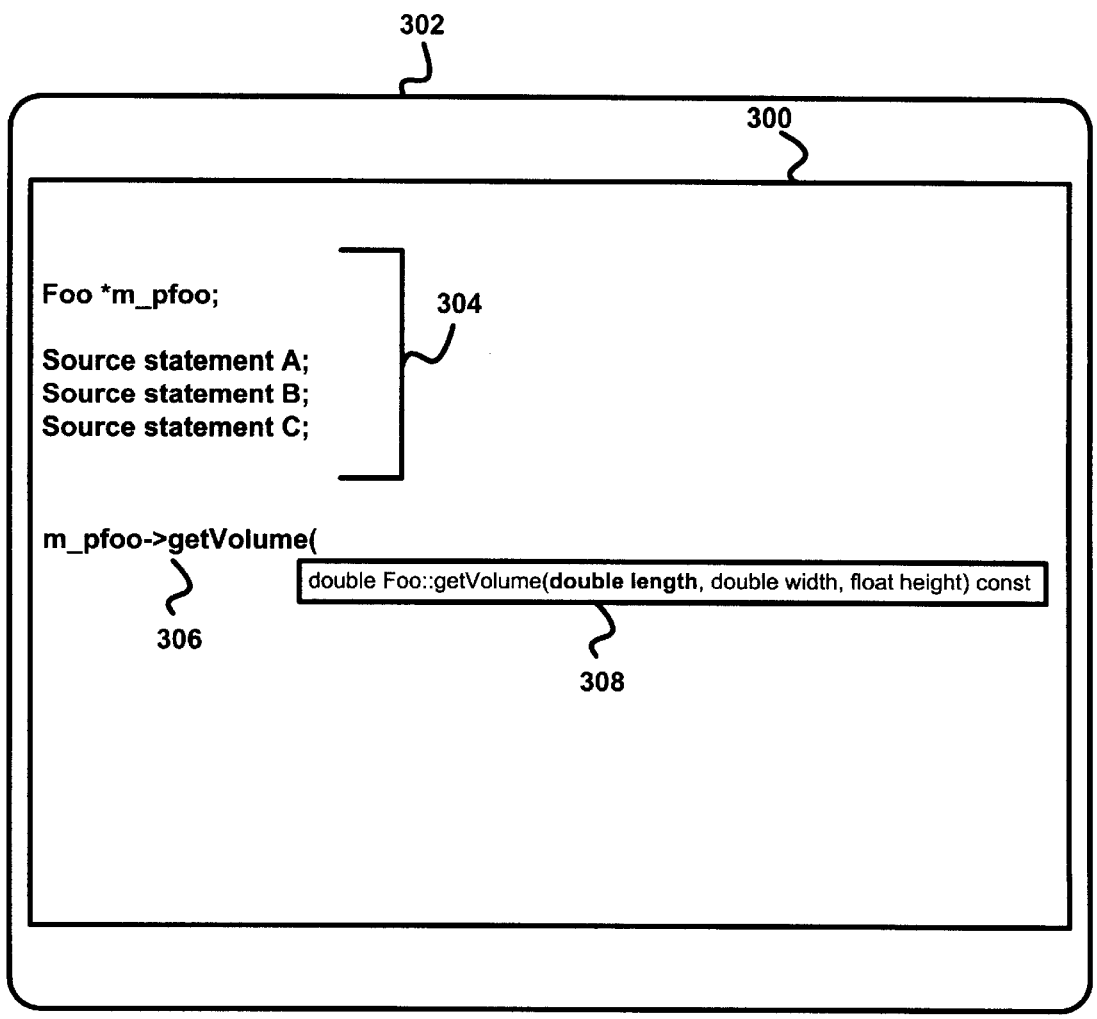
FIGS. 3(b), 3(c), 3(d), 3(e) and 3(f) are illustrations of representative screen shots of an IDE where the automatic help module has been invoked; and, FIG. 4 shows a flowchart illustrating a method according to one embodiment of the invention.

Referring now to FIG. 3(b), a block diagram of a representative screen shot of an editor component of an IDE according to one embodiment of the invention is presented. Within screen 300 of display 302, several previously entered lines of code 304 are shown, along with a current line of code 306. As the developer is editing line 306, the developer enters an expression component comprising object pointer name, "m_pfoo", which is an identifier that points at an object of class Foo and a reference to class member function "getVolume" followed by a '('. The editor detects a possible entry of the member function identifier because of the '('token, and invokes the automatic help module 220. Automatic help module 220 invokes the parser 215 to parse the code from the start of the function to the expression at the cursor position and returns parser data that is used by the automatic help module 220 to create a tooltip box 308 to display the function type, class name, and parameter list for the function getVolume. Because the user has not entered any parameters yet, the first parameter is considered a missing required parameter and is highlighted. In the representative screen shot, highlighting is indicated by displaying the parameter in bold type. Those of ordinary skill in the art will recognize that other highlighting mechanisms could be used, such as italic fonts, alternate text colors, underlining or any combination thereof. As the user enters parameters, the highlighting is moved to the next missing parameter. In an alternative embodiment of the invention (not shown), code comments are displayed in tooltip box 308. In the example above, the function return type and parameter set shown in tooltip box 308 are displayed in addition to the text "//getVolume calculates a volume for the object."

The parser action described above is more fully described in the cofiled, copending, coassigned applications entitled "Dynamic Parsing" and "Automatic Statement Completion", both of which have been previously incorporated by reference.

Figure 3C:
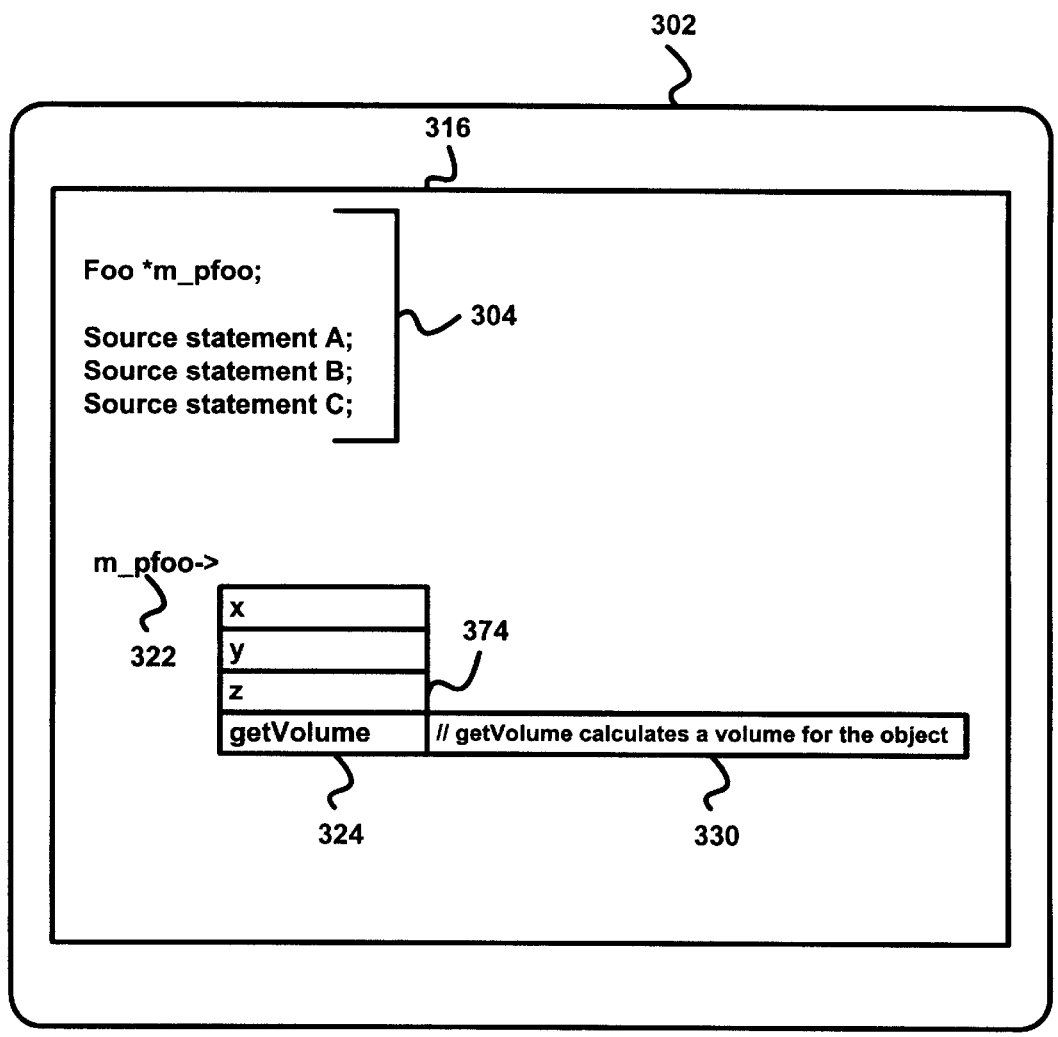

In FIG. 3(c), a screen of an alternative embodiment of the invention is shown. Similar to screen 300, screen 316 contains a section of previously entered lines of code 304. Current code line 322 starts with an identifier "m_pfoo", which is a pointer to a member of the class Foo. The identifier is followed by the C/C++ pointer operator. Drop down box 324 is displayed by an automatic statement completion module that has been more fully described in cofiled, coassigned and copending application entitled "Automatic Statement Completion", previously incorporated by reference. The drop down box displays a list of valid tokens that can follow the pointer operator. As the user moves the cursor down the drop down box, automatic help module 220 displays tool tip box 330 next to the highlighted entry, which contains help information about the identifier. In one embodiment of the invention, comments within the source code near the declaration of the entity, if any, are displayed. In a further embodiment (not shown), entity data type information is displayed.

It is desirable to display the help information only if the user pauses at an entry. In this manner, the help is provided unobtrusively and only as required so that the user's actions are not delayed and the user's train of thought is not unduly interrupted. In addition, it is desirable that the system utilizes only idle CPU cycles to provide the help information. Idle cycles are typically plentiful, especially while the programmer pauses to think over their code.

In some programming languages, function overloading makes it possible for a single function identifier to be used for multiple function definitions, each having a unique set of parameters and parameter data types. In this case, an embodiment of the invention displays a drop-down box similar to drop down box 324 which includes a line for each overloaded function, in addition to other valid tokens that may be entered at that point in the current statement. As the user moves down the box, automatic help module 220 displays a tool tip box 330 containing help information for the highlighted entry in the drop down box. For the functions in the list, the help information includes the parameter list for the highlighted entry. In an alternative embodiment of the invention, as the user enters parameters, the list in drop down box 324 is pruned to remove those functions where the entered parameter types do not match the particular overloaded function's parameter set.

Figure 3D:
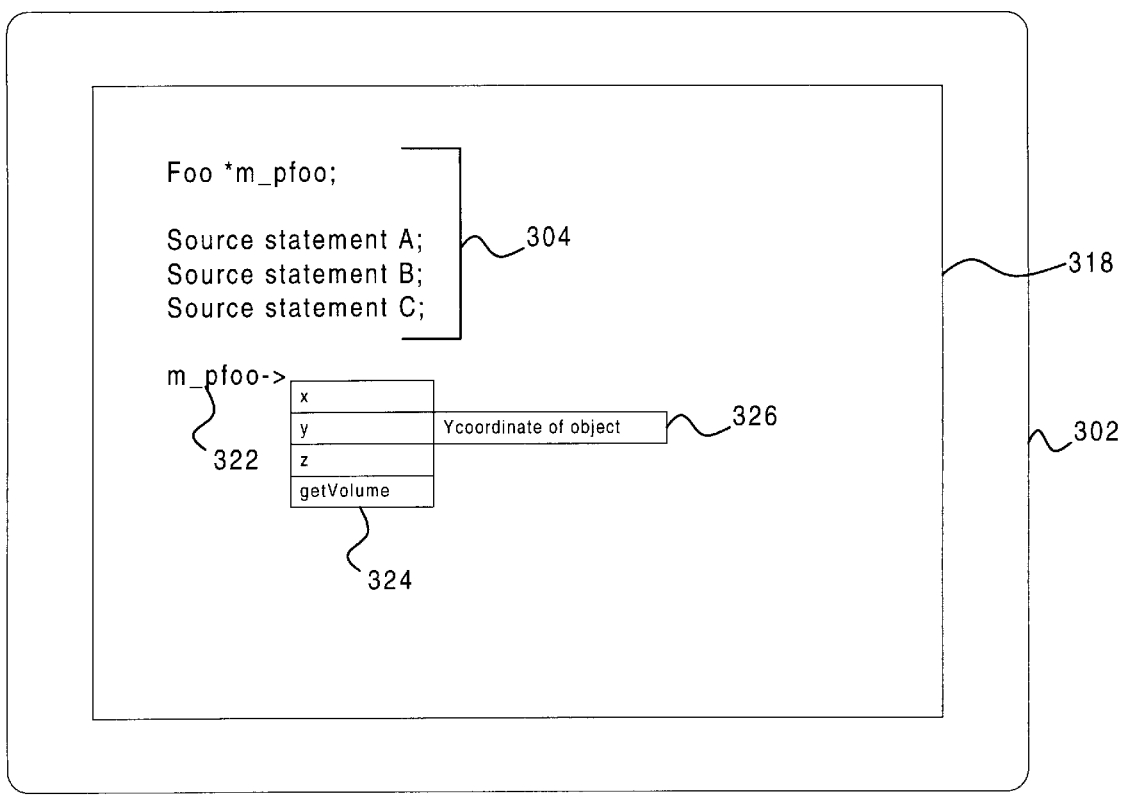

In FIG. 3(d), a screen shot of an alternative embodiment of the invention is shown. In this embodiment, screen 318 contains previously entered code 304, current line 322, and drop down box 324, all described with reference to FIG. 3(c) above. Here, the user has highlighted an entry in the drop down box corresponding to the "y" member attribute of class Foo. In this embodiment of the invention, tool tip box 326 contains comments located on or near the line in the source code where the "y" member attribute is defined (source line 365 of FIG. 3(a) in this example). Automatic help module 220 queries database 225 in order to obtain the information necessary to locate the source code line where "y" is defined.

Figure 3E:
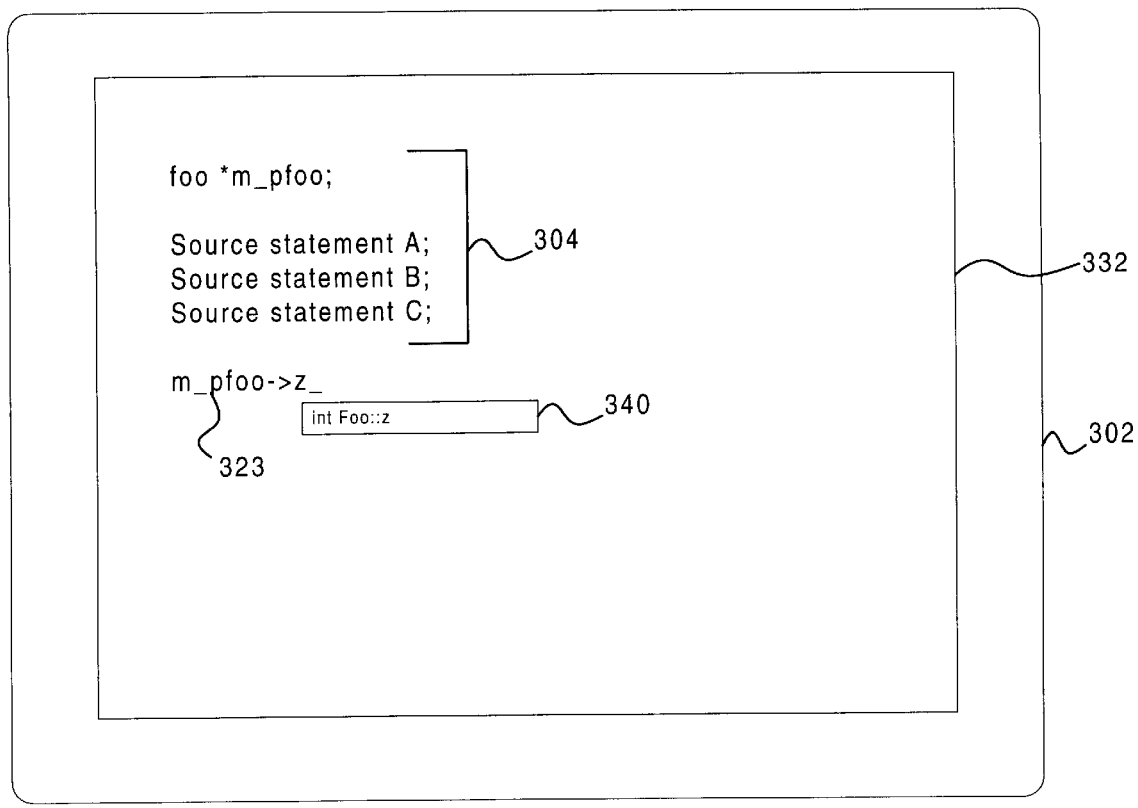

FIG. 3(e) shows a representative screen shot of an alternative embodiment of the invention where data type information is presented to the user. Like screen 318, screen 332 contains previously entered code 304. In addition, screen 332 contains a current line 323. In screen 332, the user has entered the "z" member attribute of class Foo. In this embodiment of the invention, tooltip box 340 displays help information to the user comprising the data type of the identifier, and the class, if any, to which the identifier belongs. Automatic help module 220 queries database 225 to obtain the data type and class information for the identifier.

Figure 3F:
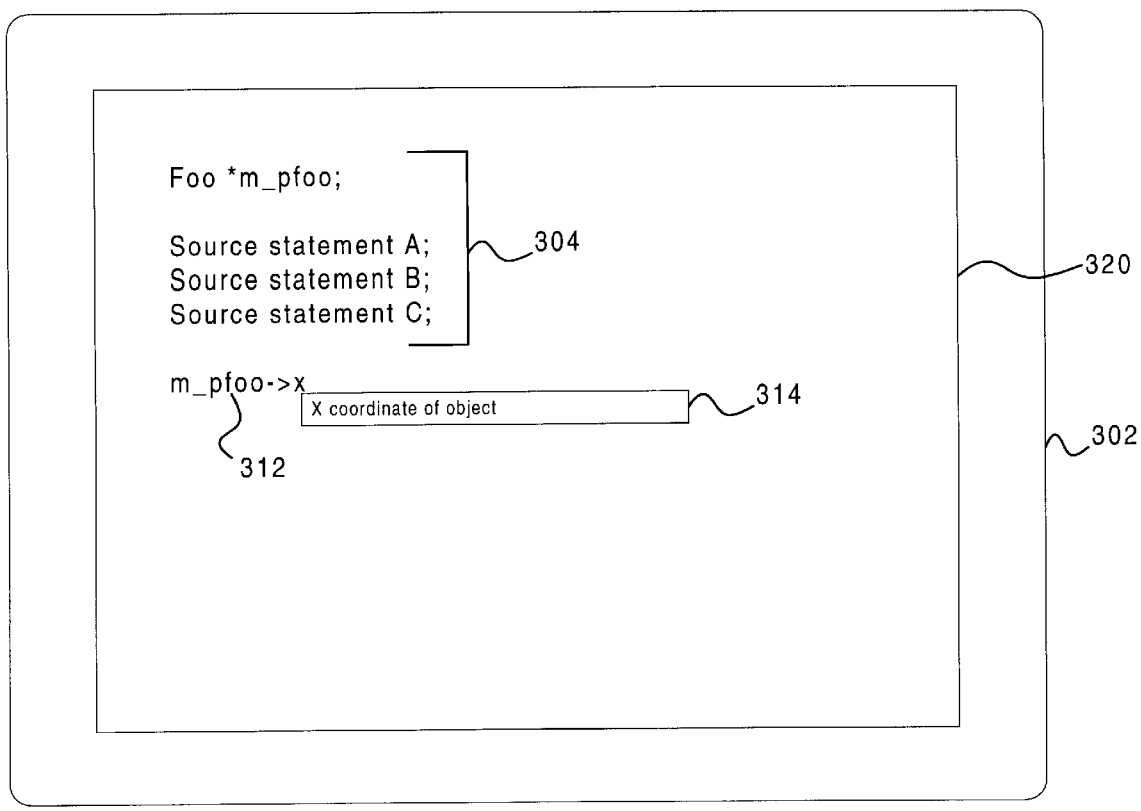

Referring now to FIG. 3(f), a representative screen shot of an alternative embodiment of the invention is presented. Like screens 318 and 332, screen 320 of display 302 contains several previously entered lines of code 304. In addition, screen 316 has a current line of code 312. As the developer is editing line 312, the developer enters an expression component comprising object pointer name, "m_pfoo", which is an identifier that points at an object of class Foo and a reference to member attribute "x". The IDE detects the entry of the member attribute identifier, and invokes the automatic help module 220. Automatic help module 220 causes tooltip box 314 to display the comments associated with the attribute "x". In an alternative embodiment of the invention, automatic help module 220 causes tooltip box 314 to be displayed when a mouse cursor is positioned near the "x" in line 312. In a further alternative embodiment of the invention, the text displayed in the tooltip box 314 toggles between data type and class information, and code comment information. The toggling is initiated by holding the control key down as the mouse cursor hovers near the identifier.

As discussed above, the reference information contained in the tooltip boxes of the various embodiments of the invention include data type, class membership, and code comments associated with a token or identifier. Those of ordinary skill in the art will recognize that other types of reference information could be displayed and are within the scope of the invention. For example, information obtained from on-line documentation resident on the computer system or available from another system connected via a network could also be displayed in the tooltip box.

In the embodiments described above with reference to FIGS. 3(b)–3(f), the automatic help module uses the parser to determine the data types and classes for the tokens when help information is displayed. For example, the "m_pfoo" identifier shown in line 322 is a pointer to a member of the class Foo. The automatic help module 220 must use the parser to discover the fact that m_pfoo is such a pointer, and that it refers to a member of class Foo. The example expression provided in line 322 is a relatively simple example used to illustrate the invention, however the invention is not so limited, and the expressions for which help information is provided can be arbitrarily complex. The operation of the parser described above is more fully described in the patent application entitled "Dynamic Parsing" and "Automatic Statement Completion" which have been previously incorporated by reference.

Thus, in this manner, the invention provides for advantages not found within the prior art. As the source code is written (developed) by a computer programmer via the editor, the automatic help module is invoked upon the occurrence of an event to provide reference information for an identifier. Unlike prior systems and methods, the developer does not have to take focus away from the editor to consult paper documentation, on-line documentation, other source files, or other tool windows containing class hierarchies and the like.

Method

In this section of the detailed description, a method according to an embodiment of the invention is presented. This description is provided in reference to FIG. 4. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to automatically provide help in the form of reference information on an identifier.

Figure 4:
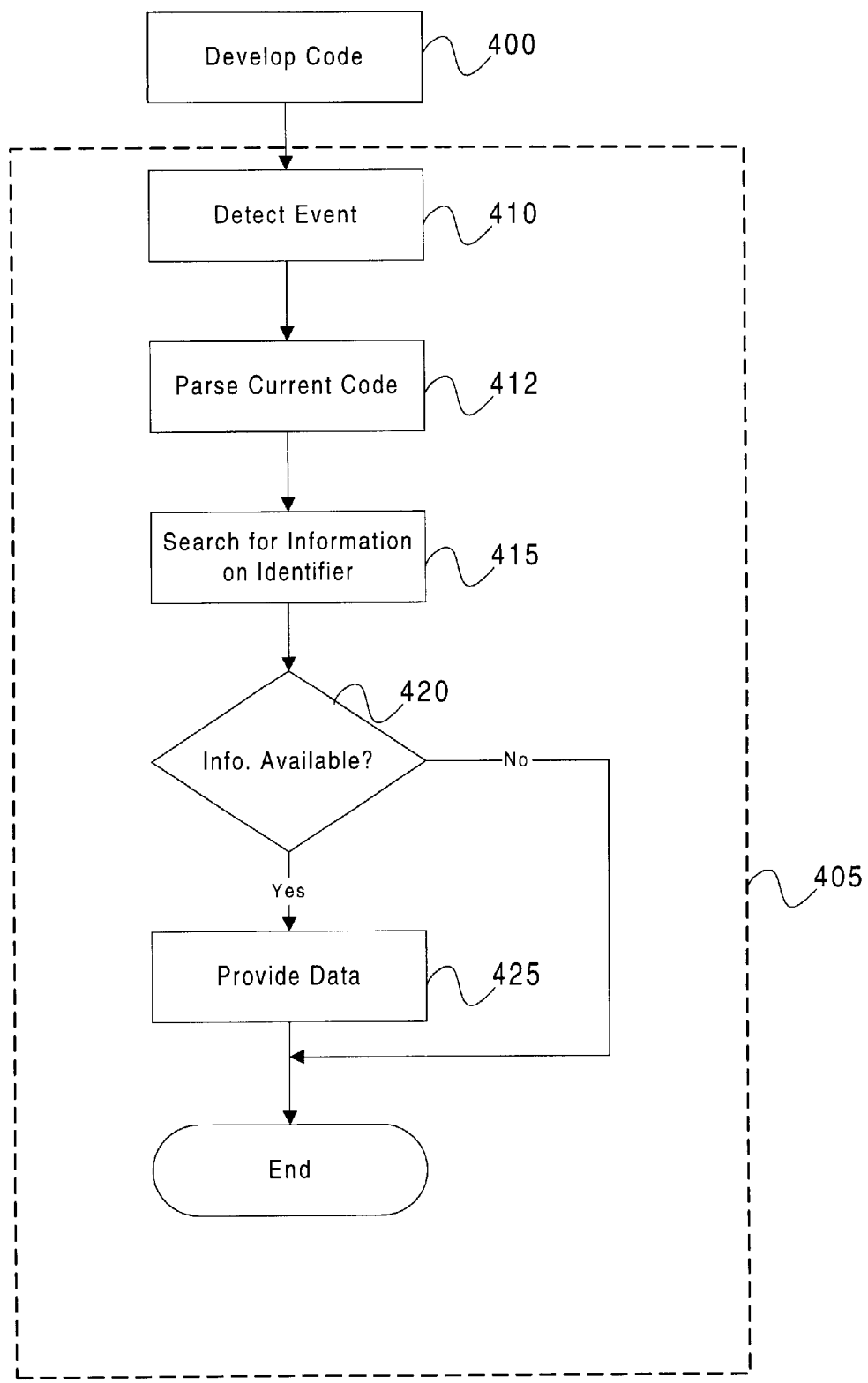

Referring now to FIG. 4, a flowchart of a method according to one embodiment of the invention is shown. In 400, at least a section of source code for a computer program is developed (written). Such source code may be written by a computer programmer utilizing an editor component of an IDE. In 405, help information comprising reference information on an identifier is displayed upon the occurrence of an event. In one embodiment, the display of the help information in 405 is accomplished via 410, 412, 415, 420 and 425.

In 410, a predetermined event is detected indicating that automatic help information should be displayed. Typically, an editor component of an IDE will detect the event, however other components of the IDE may also detect the event. In one embodiment, the event occurs when the developer enters an identifier for a function (method) or attribute. In an alternative embodiment, the event occurs when a cursor is positioned over the identifier. In a further alternative embodiment of the invention, the event occurs when the mouse cursor "hovers" over the identifier. In yet another embodiment of the invention, the event occurs when the user selects from a menu, selects an icon, or uses a context sensitive popup menu.

Upon the detection of an event at 410, the method proceeds to 412 and invokes a parser to determine the data type and class, if any, to which the identifier belongs. The parser applies the rules applicable to the particular programming language in order to determine the data type and class. The operation of the parser is more fully described in the patent application entitled "Dynamic Parsing" and "Automatic Statement Completion", which have been previously incorporated by reference.

The method then proceeds to 415, which uses the type and class information obtained from step 412 as the basis for a query to search for information on the identifier. In one embodiment of the invention, a dynamic database containing class definition information from potentially multiple varying sources is searched. Function definition information, source file names and line numbers where the identifier is defined are included in the information stored in the database. In one embodiment of the invention, if the identifier is a function name, the parameter list for the function is retrieved from the database. A parameter list is also obtained for macros, templates, attributes and other entities that have a parameter list. In the case of an overloaded function, a plurality of parameter lists are obtained. If the identifier is an attribute name, the file name containing the attribute definition and the line number within the file where the attribute is defined are retrieved from the database. The method then uses the information to scan the file for comments near the attribute definition. These comments are then retrieved from the source file.

At 420 a check is made to see if any information in the form of data from a database or code comments was retrieved at 415. If insufficient information is available, the method terminates. Otherwise, the method proceeds to 425 where the information is displayed. In one embodiment of the invention, a tooltip box displays the information retrieved at 415. In one embodiment of the invention, if the identifier is a function name, and the function is what is known in the art as an overloaded function, then a drop-down box containing a plurality of function parameter sets is displayed. In an alternative embodiment of the invention, as the user enters more information, the list of items in the drop-down box is pruned to remove those functions that are incompatible with what the user has entered so far. The reference information displayed for the function reflects the parameters for the remaining functions in a tooltip box.

In an embodiment of the invention, the first parameter in the parameter list displayed in the tooltip box is highlighted. As the developer enters further parameters in the source code, the highlighting moves to the next parameter to be supplied by the developer. When all required parameters have been supplied, the help information is no longer displayed.

In another embodiment of the invention, while one instance of automated help is at work, if another event causing automated help is detected the automated help is provided for the second instance and upon completion the previous instance is resumed. This is especially useful if one of the parameters to a function is also a function (referred to as a second function). In this case, parameter help for the second function is provided and when that is finished, parameter help for the original function is resumed.

In yet another embodiment of the invention, when the user hovers over an identifier (or an event is detected that invokes 'identifier info' i.e. selection of an icon, menu item, or context sensitive popup menu) then automatic help is provided about that identifier using the mechanism outlined above.

Conclusion

An automated help system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
   an editor to provide for developing source code for a computer program, said source code including an identifier entered by a user when the user is entering source code in the editor; and
   an automatic help module invoked upon a predetermined event and operative to display information associated with the identifier including at least one of a description of the identifier, a description of the type of identifier and a description of syntax associated with the identifier for further entry by the user, said information being displayed directly in response to said predetermined event without further action by the user of the editor.

2. The system of claim 1, wherein the identifier is a function name, macro name, or template name.

3. The system of claim 2, wherein the reference information comprises a parameter list for a function identified by the function name.

4. The system of claim 3, wherein a required parameter is highlighted within the reference information.

5. The system of claim 1, wherein the identifier is an attribute name.

6. The system of claim 1, wherein the reference information is displayed within a tooltip box.

7. The system of claim 1, further comprising a database module operative to supply at least a subset of the information when queried by the automated help module.

8. The system of claim 7, wherein the database module manages a pre-created database and a dynamically updated database, said pre-created database and dynamically updated database containing reference information on a plurality of entities; and wherein the automatic help module queries said pre-created database and dynamically updated database to obtain reference information on an entity matching the identifier.

9. The system of claim 1, further comprising a parser operative to parse the source code and to obtain parsed data for the identifier.

10. The system of claim 9, wherein the parsed data includes a data type for the identifier.

11. The system of claim 9, wherein the parsed data includes a class specifier for the identifier.

12. The system of claim 1, wherein the automatic help module further comprises a comment search module operative to scan a set of source code for a code comment associated with the identifier and wherein the reference information displayed comprises the code comment.

13. The system of claim 1, wherein the predetermined event occurs when a cursor is positioned over the identifier.

14. The system of claim 1, wherein the predetermined event occurs when the identifier is entered into the source code.

15. A method comprising:
developing at least a section of source code for a computer program, said source code including an identifier entered by a user when the user is entering said section of source code;
detecting an event;
searching for information on the identifier including at least one of a description of the identifier, a description of the type of identifier and a description of syntax associated with the identifier for further entry by the user in response to the event; and
displaying the information directly in response to said event without further action by the user of the editor.

16. The method of claim 15, wherein the event comprises entering an identifier into the source code.

17. The method of claim 15, wherein the event comprises positioning a cursor over the identifier.

18. The method of claim 15, wherein searching for information includes searching a database for information.

19. The method of claim 15, wherein searching for information includes searching a source file for comments associated with the identifier.

20. The method of claim 15, wherein displaying the information displays the information in a tooltip box.

21. The method of claim 15, wherein searching for information includes dynamically parsing the section of source code to provide parsed data and using a subset of the parsed data as a search parameter.

22. A computer comprising:
a processor;
a computer-readable medium;
an editor to provide for developing source code for a computer program, said source code including an identifier entered by a user when the user is entering source code in the editor; and
an automatic help module invoked upon a predetermined event detected by the editor and operative to display reference information associated with the identifier including at least one of a description of the identifier, a description of the type of identifier and a description of syntax associated with the identifier for further entry by the user, said information being displayed directly in response to said predetermined event without further action by the user of the editor.

23. The computer of claim 22, wherein the identifier is a function name.

24. The computer of claim 22, wherein the identifier is an attribute name.

25. The computer of claim 22, wherein the reference information is displayed within a tooltip box.

26. The computer of claim 22, further comprising a database module containing at least a subset of the reference information.

27. The computer of claim 26, wherein the database module manages a pre-created database and a dynamically updated database, said pre-created database and dynamically updated database containing reference information on a plurality of entities; and wherein the automatic help module queries said pre-created database and dynamically updated database to obtain the reference information.

28. The computer of claim 22, further comprising a parser operative to parse the source code and to obtain parsed data for the identifier.

29. The computer of claim 28, wherein the parsed data includes a data type for the identifier.

30. The computer of claim 28, wherein the parsed data includes a class specifier for the identifier.

31. The computer of claim 22, wherein the reference information comprises a parameter list for a function identified by the identifier.

32. A computer readable medium containing computer-executable instructions for performing a method comprising:
developing at least a section of source code for a computer program, said source code including an identifier entered by a user when the user is entering said section of source code;
detecting an event;
searching for information on the identifier including at least one of a description of the identifier, a description of the type of identifier and a description of syntax associated with the identifier for further entry by the user in response to the event; and
displaying the information directly in response to said event without further action by the user of the editor.

33. The medium of claim 32, wherein the event comprises entering an identifier into the source code.

34. The medium of claim 32, wherein the event comprises entering a separator token into the source code.

35. The medium of claim 32, wherein the event comprises positioning a cursor over the identifier.

36. The medium of claim 32, wherein searching for information includes searching a database for information.

37. The method of claim 32, wherein searching for information includes searching a source file for comments associated with the identifier.

38. The method of claim 32, wherein displaying the information displays the information in a tooltip box.

39. The method of claim 32, wherein searching for information includes dynamically parsing the section of source code to provide parsed data and using a subset of the parsed data as a search parameter.

* * * * *

UNITED STATES PATENT AND TRADEMARK OFFICE
CERTIFICATE OF CORRECTION

PATENT NO.    : 6,502,233 B1
DATED         : December 31, 2002
INVENTOR(S)   : Shankar Vaidyanathan et al.

It is certified that error appears in the above-identified patent and that said Letters Patent is hereby corrected as shown below:

<u>Title page,</u>
Item [74], *Attorney, Agent, or Firm* – Woodcock Washburn LLP --.

Signed and Sealed this

Seventeenth Day of June, 2003

JAMES E. ROGAN
*Director of the United States Patent and Trademark Office*

(12) EX PARTE REEXAMINATION CERTIFICATE (6049th)
United States Patent
Vaidyanathan et al.

(10) Number: US 6,502,233 C1
(45) Certificate Issued: Dec. 11, 2007

(54) AUTOMATED HELP SYSTEM FOR REFERENCE INFORMATION

(75) Inventors: Shankar Vaidyanathan, Bellevue, WA (US); Philip Lucido, Redmond, WA (US); Sundeep Bhatia, Bellevue, WA (US)

(73) Assignee: Microsoft Corporation, Redmond, WA (US)

Reexamination Request:
No. 90/007,271, Oct. 27, 2004

Reexamination Certificate for:
Patent No.: 6,502,233
Issued: Dec. 31, 2002
Appl. No.: 09/191,757
Filed: Nov. 13, 1998

Certificate of Correction issued Jun. 17, 2003.

(51) Int. Cl.
*G06F 9/44* (2006.01)

(52) U.S. Cl. .................. 717/101; 717/106; 717/163
(58) Field of Classification Search ............... 717/111, 717/101, 106, 163; 715/707, 708, 113, 114, 715/512, 527, 531
See application file for complete search history.

(56) References Cited

U.S. PATENT DOCUMENTS

| | | | |
|---|---|---|---|
| 4,809,170 A | | 2/1989 | Leblang et al. ............ 717/122 |
| 4,827,404 A | * | 5/1989 | Barstow et al. ............ 703/20 |
| 4,931,928 A | | 6/1990 | Greenfeld ................ 717/131 |
| 5,006,992 A | | 4/1991 | Sheirik ................... 706/58 |
| 5,070,478 A | * | 12/1991 | Abbott .................. 715/531 |
| 5,079,700 A | * | 1/1992 | Kozoll et al. ............. 715/531 |
| 5,140,521 A | * | 8/1992 | Kozol et al. ............. 715/531 |
| 5,263,174 A | | 11/1993 | Layman .................. 715/841 |
| 5,311,422 A | | 5/1994 | Loftin et al. .............. 703/2 |
| 5,339,433 A | * | 8/1994 | Frid-Nielsen ............. 717/141 |
| 5,377,318 A | | 12/1994 | Wolber .................. 715/809 |
| 5,408,665 A | * | 4/1995 | Fitzgerald ............... 717/163 |
| 5,430,836 A | | 7/1995 | Wolf et al. .............. 715/744 |
| 5,450,545 A | * | 9/1995 | Martin et al. ............ 717/109 |
| 5,479,536 A | | 12/1995 | Comerford .............. 382/230 |
| 5,481,712 A | | 1/1996 | Silver et al. ............. 717/109 |
| 5,485,618 A | * | 1/1996 | Smith ................... 715/710 |
| 5,537,630 A | | 7/1996 | Berry et al. ............. 715/763 |
| 5,557,730 A | * | 9/1996 | Frid-Nielsen ............ 715/839 |
| 5,577,241 A | | 11/1996 | Spencer ................. 707/5 |
| 5,579,469 A | | 11/1996 | Pike ..................... 715/781 |
| 5,583,762 A | * | 12/1996 | Shafer .................. 715/532 |
| 5,603,021 A | * | 2/1997 | Spencer et al. ........... 707/4 |
| 5,627,958 A | | 5/1997 | Potts et al. ............. 715/708 |
| 5,628,016 A | | 5/1997 | Kukol ................... 717/140 |
| 5,644,737 A | | 7/1997 | Tuniman et al. .......... 715/810 |
| 5,649,192 A | | 7/1997 | Stucky ................. 707/103 R |
| 5,649,222 A | | 7/1997 | Mogilevsky ............. 715/533 |
| 5,671,403 A | | 9/1997 | Shekita et al. ........... 707/3 |
| 5,673,390 A | | 9/1997 | Mueller ................. 714/57 |
| 5,680,630 A | | 10/1997 | Saint-Laurent .......... 715/534 |
| 5,694,559 A | * | 12/1997 | Hobson et al. .......... 715/705 |
| 5,724,589 A | * | 3/1998 | Wold ................... 719/318 |
| 5,724,593 A | | 3/1998 | Hargrave, III et al. ..... 704/7 |

(Continued)

OTHER PUBLICATIONS

"User Interaction in Language–Based Editing Systems", Van De Vanter, Michael Lee, Ph.D. University of California, Berkeley, 1992, 206 pages, DISSERTATION.*
"Visual Basic Getting Started Programming System for Windows", Microsoft, Getting Started Microsoft Visual Basic Version 5.0, Chapter 2, No Date.*

(Continued)

*Primary Examiner*—Joseph R. Pokrzywa

(57) ABSTRACT

Automatic paramater help is disclosed. In one embodiment, the system comprises an editor to provide for developing source code for a computer program, where the source code includes an identifier; and an automatic help module invoked upon a predetermined event by the editor. The automatic help module is operative to display reference information associated with the identifier.

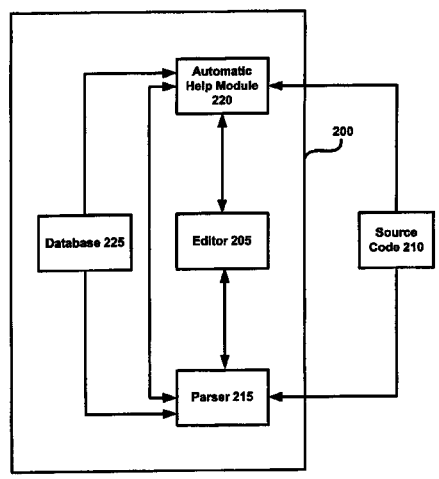

U.S. PATENT DOCUMENTS

| | | | | | |
|---|---|---|---|---|---|
| 5,734,749 | A | * | 3/1998 | Yamada et al. | 382/187 |
| 5,737,608 | A | * | 4/1998 | Van De Vanter | 717/112 |
| 5,740,444 | A | * | 4/1998 | Frid-Nielsen | 717/102 |
| 5,748,963 | A | * | 5/1998 | Orr | 717/131 |
| 5,748,975 | A | * | 5/1998 | Van De Vanter | 715/531 |
| 5,752,058 | A | * | 5/1998 | Van De Vanter | 715/531 |
| 5,754,737 | A | * | 5/1998 | Gipson | 706/11 |
| 5,778,402 | A | * | 7/1998 | Gipson | 715/530 |
| 5,781,720 | A | | 7/1998 | Parker et al. | 714/38 |
| 5,787,431 | A | * | 7/1998 | Shaughnessy | 707/100 |
| 5,790,778 | A | | 8/1998 | Bush et al. | 714/38 |
| 5,798,757 | A | | 8/1998 | Smith | 715/709 |
| 5,802,262 | A | * | 9/1998 | Van De Vanter | 714/1 |
| 5,805,889 | A | * | 9/1998 | Van De Vanter | 717/107 |
| 5,813,019 | A | * | 9/1998 | Van De Vanter | 715/512 |
| 5,825,308 | A | * | 10/1998 | Rosenberg | 341/20 |
| 5,825,355 | A | | 10/1998 | Palmer et al. | 715/712 |
| 5,844,554 | A | | 12/1998 | Geller et al. | 715/744 |
| 5,845,120 | A | | 12/1998 | Reddy et al. | 717/125 |
| 5,845,300 | A | * | 12/1998 | Comer et al. | 715/508 |
| 5,850,561 | A | | 12/1998 | Church et al. | 715/532 |
| 5,854,936 | A | * | 12/1998 | Pickett | 717/162 |
| 5,857,212 | A | * | 1/1999 | Van De Vanter | 715/519 |
| 5,859,638 | A | | 1/1999 | Coleman et al. | 715/786 |
| 5,872,974 | A | | 2/1999 | Mezick | 717/109 |
| 5,877,758 | A | | 3/1999 | Seybold | 715/866 |
| 5,905,892 | A | | 5/1999 | Nielsen et al. | 717/145 |
| 5,911,059 | A | | 6/1999 | Profit, Jr. | 703/23 |
| 5,911,075 | A | | 6/1999 | Glaser et al. | 717/100 |
| 5,923,881 | A | | 7/1999 | Fujii et al. | 717/125 |
| 5,924,089 | A | | 7/1999 | Mocek et al. | 707/4 |
| 5,959,629 | A | | 9/1999 | Masui | 715/808 |
| 6,012,075 | A | | 1/2000 | Fein et al. | 715/540 |
| 6,016,467 | A | | 1/2000 | Newsted et al. | 704/9 |
| 6,018,524 | A | | 1/2000 | Turner et al. | 370/392 |
| 6,023,715 | A | | 2/2000 | Burkes et al. | 715/514 |
| 6,026,233 | A | * | 2/2000 | Shulman et al. | 717/113 |
| 6,053,951 | A | * | 4/2000 | McDonald et al. | 717/109 |
| 6,061,513 | A | | 5/2000 | Scandura | 717/142 |
| 6,071,317 | A | | 6/2000 | Nagel | 717/128 |
| 6,115,544 | A | | 9/2000 | Mueller | 714/57 |
| 6,119,120 | A | | 9/2000 | Miller | 707/101 |
| 6,163,879 | A | | 12/2000 | Mackey | 717/111 |
| 6,205,579 | B1 | | 3/2001 | Southgate | 717/173 |
| 6,208,339 | B1 | * | 3/2001 | Atlas et al. | 715/780 |
| 6,247,020 | B1 | * | 6/2001 | Minard | 707/104.1 |
| 6,266,665 | B1 | | 7/2001 | Vaidyanathan et al. | 707/7 |
| 6,269,475 | B1 | * | 7/2001 | Farrell et al. | 717/113 |
| 6,275,976 | B1 | | 8/2001 | Scandura | 717/120 |
| 6,305,008 | B1 | * | 10/2001 | Vaidyanathan et al. | 717/111 |
| 6,311,323 | B1 | * | 10/2001 | Shulman et al. | 717/111 |
| 6,314,559 | B1 | * | 11/2001 | Sollich | 717/111 |
| 6,901,579 | B1 | | 5/2005 | Suguta | 717/108 |
| 2002/0100016 | A1 | * | 7/2002 | Van De Vanter et al. | 717/112 |

OTHER PUBLICATIONS

"Syntactic and Semantic Checking in Language–Based Editing Systems", Robert Alan Balance, University of California, Berkeley, Dec. 1989, 249 pages.*

Microsoft Press Computer Dictionary, Second Edition, p. 82, published Nov. 10, 1993.*

M. Van De Vanter et al, "Coherent User Interfaces for Language–Based Editing Systems", International Journal of Man–Machine Studies, vol. 37, No. 4 (1992), pp. 431–466.*

Special Edition Using Microsoft Excel 97, Ron Person, Dec. 17, 1996, Getting In–Depth Help Online, 2 pages, Printout from Safari Books.*

Special Edition Using Microsoft Excel 97, Bruce Hailberg et al. Oct. 16, 1997, Controlling Toolbars with VBA, 4 pages Printout from Safari Books.*

Developing JAVA Beans, Robert Englander, O'Reilly, Jun. 1997, 10 pages, Printout from Safari Books.*

Teach Yourself Visual Basic 5 for Applications in 21 Days, Harris Mathew, 1997, 2 pages print out from eBook.*

Teach Yourself Borland C++ 5 in 21 Days, Arnush Craig et al, 1996, 2 pages print out from eBook.*

Teach Yourself Visual Basic 5 in 24 Hours, Greg M. Perry, 1997, 3 pages print out from eBook.*

Object Pascal Language Guide, Delphi for Windows, Borland, 1995, Whole Manual.*

Practical JavaScript Programming, Reaz Hoque, Feb. 20, 1997, pp. 35–40.*

"Compilers Principles, Techniques and Tools", Aho et al, Chapters 1–5, Sep. 12, 1985.*

"Three Models For Description of Language", Noam Chomsky, MIT, 1956, IRE Trans. Infor Theory, pp. 113–124.*

"The PAN Language–Based Editing System", Robert A Balance et al, ACM Transactions, Jan. 1992, pp. 95–127.*

"The PSG System: From Formal Language Definitions To Interactive Programming Environments", Rolf Bahlke et al, ACM, Oct. 1986, pp. 547–576.*

"Structure–based Editors and Environments", Michael L. Van Vanter et al, pp. 20–69, 1996.*

"The Cornell Program Synthesizer: A Suntax–Directed Programming Environment", Tim Teitelbaum et al., Cornell University, Communications of the ACM, Sep. 1981, pp. 563–573.*

"The Synthesizer Generator Reference Manual", Third edition, Thomas W. Reps et al, pp. 1–171, 1988.*

"Automatic Generation of Help from Interface Design Models", Robert Moriyon, Human Factors in Computing Systems, ACM, 1994, pp. 225–231.*

"Automatic Generation of Textual, Audio, and Animated Help in UIDE: The User Interface Design Environment", Piyawadee Sukavirya et al, ACM, 1994, pp. 44–52.*

"Online Help in the Real World", Susan D. Goodall, ACM, 1991, pp. 21–29.*

"A Windows–Based Help, Tutorial and Documentation System"Jean–Marie Comeau et al, ACM, 1993, pp. 71–82.*

"Practical Language–Based Editing for Software Engineers", Michael L. Van De Vanter, Sun Microsystems Labs, pp. 251–267, 1995.*

"The Gandalf Project", David Notkin, Journal of Systems and Software, pp. 91–105, 1985.*

"Cognition–Sensitive Design and User Modeling for Syntax–Directed Editors", Lisa Rubin Neal, ACM, pp. 99–102, 1987.*

"Delocalized Plans and Program Comprehension", Stanley Letovsky et al, IEEE, pp. 41–49, 1986.*

"On the Usefulness of Syntax Directed Editors", Bernard Lang, Advanced Programming Environments, pp. 47–51, 1986.*

"Programming Environments Based on Structured Editors: The MENTOR Experience", Veronique Donzeau–Gouge, et al., Interactive Programming Environments, pp. 128–140, 1984.*

"Centaur: the system", P. Borras et al, ACM, pp. 14–ACM, pp. 14–24, 1988.*

"The Extensible, Customizable Self–Documenting Display Editor", Richard M. Stallman et al, ACM, pp. 147–156, 1981.*

"Impirical Studies on Programming Knowledge" Elliot, Soloway et al, IEEE, 1984, pp. 595–609.*

"Go Beyond Text Editing, Using the Advances in Source Insight", Nancy Nicolaisen, Computer Shopper, v16, n4, p. 584, Apr. 1996—4 pages.*

"Delphi 3 Client/Server Suite—Delphi's RAD New Features Shine", James E. Powell, Windows Magazine, n806, 1997, p. 158—2 pages.*

"TakeFive's SNiFF plus let you tailor your own development environment", Tim Parker, UNIX Review, v15n4, Apr. 1997, p. 61–62—3 pages.*

"Delphi 3.0: Proof that Pascal Lives", Peter Coffee, Windows Sources, v5, n6, p. 92, Jun. 1997—2 pages.*

"Application Development—Programmers Need to Meet More Demands Than Ever. These Progducts Can Help", Windows Magazine, n 806A, 1997, p. 123—2 pages.*

"Delphi 3 Delivers Potent Programming", Neil Rubenking, PC Magazine, v16, n15, p. 64, Sep. 9, 1997—2 pages.*

"Borland Debuts Delphi 3 Suite", Darryl K. taft, Computer Reseller News, n734, 1997, p. 28—2 pages.*

"Borland Delphi: Third Time's A Charm", Kenn Nesbitt, Databased Web Advisor, v15, n7, p. 70, Jul. 1997—7 pages.*

"Influence of Visual Technology on the Evolution of Language Environments", Visual Programming Environments Paradigms and Systems, IEEE,Allen L. Ambler et al, 1989, pp. 19–32.

I"SPD: A Humanized Documentation Technology", Visual Programming Environments Paradigms and Systems, IEEE, Motoel Azuma et al, 1985, pp. 115–123.

"Intelligent Assistance for Software Construction: A Case Study", Loren G. Terveen et al, IEEE, 1994, pp. 14–21.

"Intelligent Assistance for Software Development and Maintenance", Gail E. Kaiser et al, IEEE Software, 1988, pp. 40–49.

"Visual Craft: A Visual Integrated Development Environment", Ahmed F. Hegazi et al, IEEE, 1997, pp. 210–214.*

Microsoft Corporation, "Your First Visual Basic Application," *Programmer's Guide, Visual Basic Programming System for Windows, Version 4.0*, 1995, Chapter 2, 15–34.

Microsoft Corporation, "Getting Started with Visual Basic," *Programmer's Guide, Visual Basic Programming System for Windows 95 and Windows NT, Version 5.0*, 1997, Chapter. 2, 13–31.

Microsoft Website, "What's New in Microsoft Access 97," 2003, 3 pages.

Microsoft Website, "Introduction to Visual Basic: Creating Your First Event Procedure," Chapter 2, 2003, 7 pages.

Microsoft Office Developer Web Forum, "Microsoft Access 97 Conversion Issues," Jan. 3, 1997, 14 pages.

Microsoft Office Developer Web Forum, "Syntax at your Fingertips; Automatic Statement Building," Oct. 14, 1996, 3 pages.

Microsoft Corporation, "Building Com Components that Take Full Advantage of Visual Basic Scripting," IVO Solmre, Feb. 24, 1998, 15 pages.

Microsoft Corporation, "Microsoft Access Module Tips: Let Microsoft Access Type Your Code For You," 2002, 2 pages.

Olsson, "Population Management for Automatic Design of Algorithms Through Evolution," *IEEE*, Sep. 1998, 592–597.

Pangoli, S. et al., "Automatic Generation of Task–Oriented Help," *UIST ACM*, Nov. 14–17, 1995, 181–187.

Perry, G., Overview of Book with Screen Example, "Visual Basic 5 Night School," *Programming Languages*, Mar. 1997, 2 pages.

Savitch, W., "Pointers and Dynamic Arrays," *Problem Solving with C++: The Object of Programming*, 1996, Chapter 11, 620–664.

University of Hawaii, "12.1.4: Pointers to Structures," retrieved from the Internet on Mar. 23, 2006, http://www.ee.eng.hawaii.edu/~tep/EE160/Book/chap12/subsection2.1.1.4.html, 8 pages.

Ballance, R.A. et al., "The PAN Language–Based Editing System for Integrated Development Environments," *ACM Trans.*, 1990, 77–93.

Franke et al., "Authoring a Hypertext Help Manual," *ACM*, 1995, 238–245.

Goldberg, A., "Spelling Correction" and "Syntax Errors," *Small Talk–80 The Interactive Programming Environment*, 1984, Chapters 16 and 17, 354–362 and 364–374.

Google, Online Definition of "deference," Mar. 2006, 1 page.

IBM Technical Disclosure Bulletin, "Automated Code Checker," Sep. 1993, 36(09B), 239–240.

IBM Technical Disclosure Bulletin, "Smalltalk Tokenizer and Backus–Naur Form Perser," Dec. 1994, 37(12), 313–316.

InstallShield DevStudio, "Structure Pointer Operator(–>)," retrieved from the Internet on Mar. 23, 2006, http://helpnet.installshield.com/robo/projects/devstudio9helplangref/LangrefStructure_pointer_operator.html, 7 pages.

Lesynski, S., *Access 97 Expert Solutions*, Jan. 17, 1997, 2 pages.

Microsoft Corporation, "Getting Results with Microsoft Office for Windows 95, Version 7.0," *Microsoft Press*, 1995, 303.

Microsoft Corporation, "Your First Visual Basic Application," *Programmer's Guide, Visual Basic Programming System for Windows, Version 3.0*, 1993, Chapter 2, 15–30.

Ballance, R.A., "Syntactic and Semantic Checking in Language–Based Editing Systems", 1989, 249 pages.

Borland, *Object Pascal Language Guide, Delphi for Windows*, 1995.

ForeFront Incorporated, ForeHelp User's Guide, version 1.0, 1994, 1–246.

Hoque, R., *Practical JavaScript Programming*, 1997, pp. 35–40.

*Microsoft Press Computer Dictionary, Second Edition*, 1993, p. 82.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–39 are cancelled.

* * * * *